March 27, 1934.　　　　H. A. KNOX　　　　1,952,078
TRACKLAYING VEHICLE
Filed March 23, 1933　　2 Sheets-Sheet 1
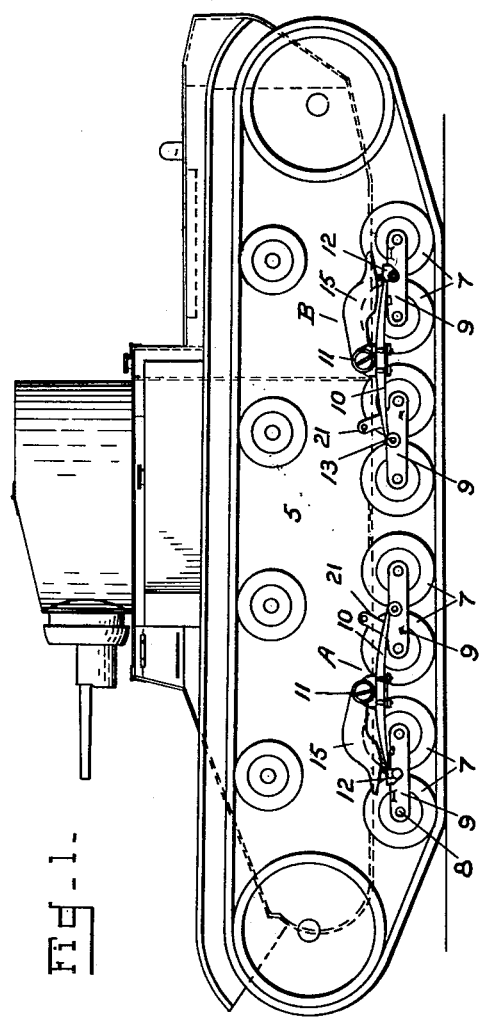
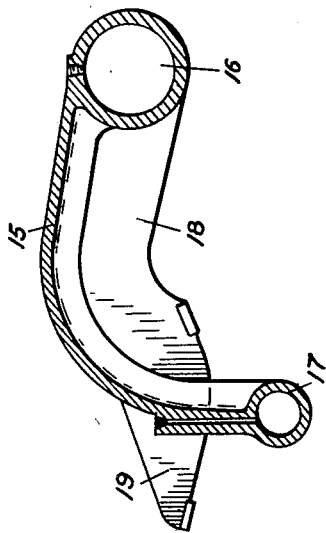
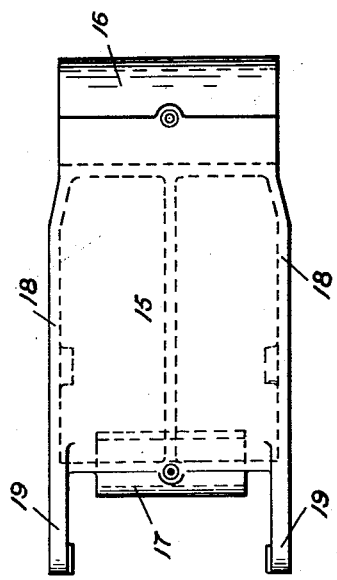
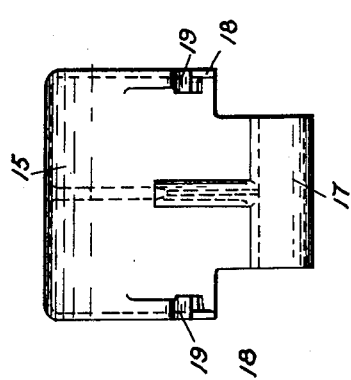
INVENTOR.
Harry A. Knox
BY W. N. Roach
ATTORNEY

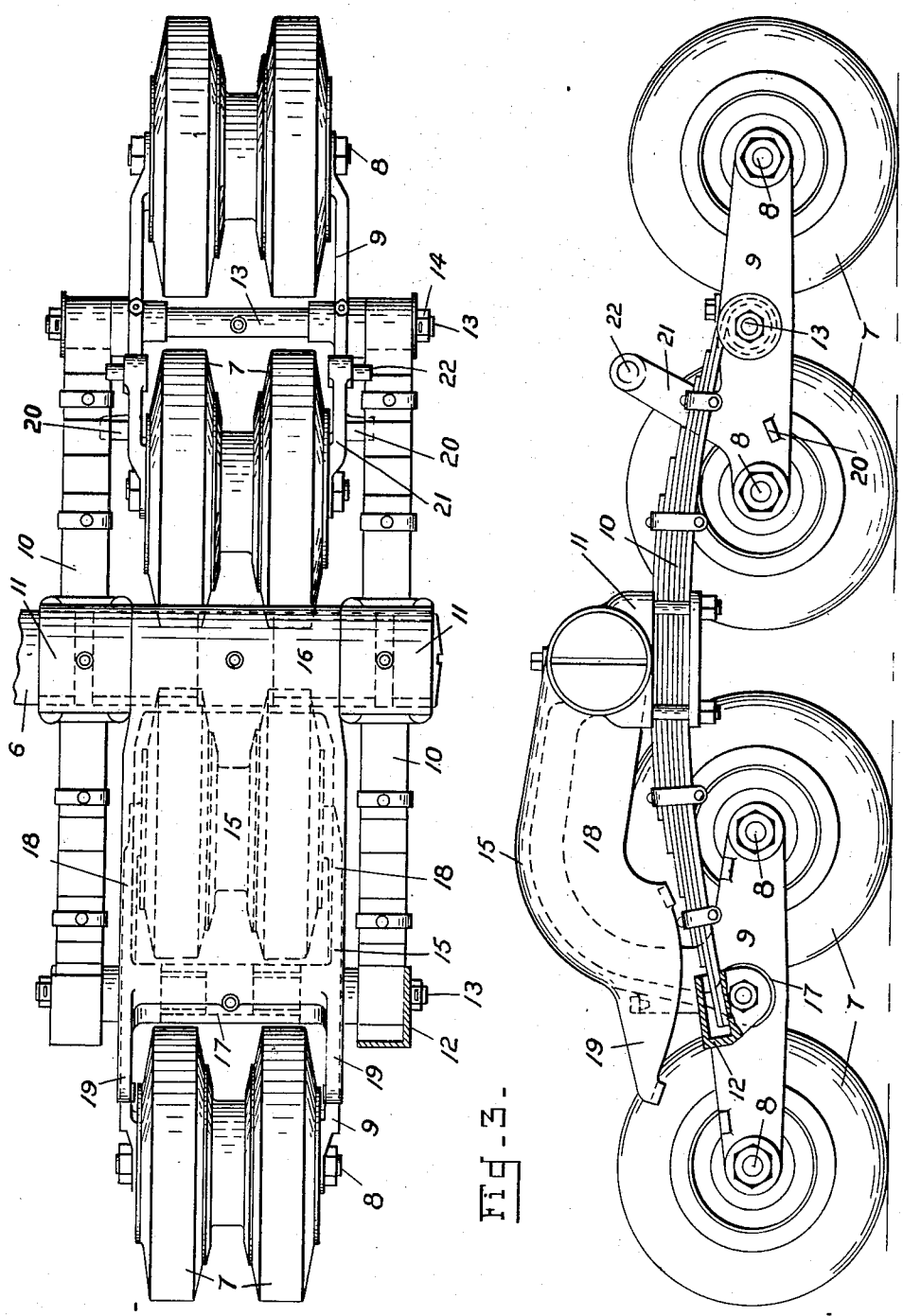

Patented Mar. 27, 1934

1,952,078

UNITED STATES PATENT OFFICE 1,952,078

TRACKLAYING VEHICLE

Harry A. Knox, Davenport, Iowa, assignor of forty-one one-hundredths to John K. Christmas, Easton, Pa.

Application March 23, 1933, Serial No. 662,260

4 Claims. (Cl. 305—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track-laying vehicle.

The purpose of the invention is to provide a suspension for track-laying vehicles in which spring mounted track units include a rigid arm for absorbing shock and guarding the spring against distortion.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a view in side elevation of a vehicle constructed in accordance with the invention.

Fig. 2 is a plan view of one of the track units.

Fig. 3 is a view in side elevation of Fig. 2.

Fig. 4 is a view in front elevation of one of the rigid arms.

Fig. 5 is a plan view thereof and

Fig. 6 is a longitudinal sectional view of the arm.

Referring to the drawings by characters of reference:

There is shown a vehicle body 5 supported on each side by a number of similar truck units A and B each carried on a shaft 6 fixed to the body.

Each truck unit consists of two groups of wheels, each group including a pair of successive wheels 7—7 mounted on axles 8—8 in the ends of a frame 9. The frames 9 of the two groups are mounted for oscillatory movement on the ends of a pair of laterally spaced semi-elliptic springs 10—10 each of which is secured centrally to a hanger or seat 11 journaled on the shaft 6. One end of each spring, being the front end of the unit A and the rear end of the unit B, is loosely mounted in a pocket 12 of the frame, while the other ends, being the inner or adjacent ends of the units A and B are wrapped around the central pivot bar 13 of the frames 9, and confined between the frame and nuts 14.

The units A and B are each supplied with rigid arms 15 overlying respectively the front and the rear portions of their springs 10. The arms 15 are identical and each has a bearing 16 on one end for mounting on the shaft 6 and a bearing 17 on the other end for mounting on the pivot bar 13 of the frame 9 between the sides of said frame. The arm 15 is angled in cross-section, the aprons 18 having extensions 19 overlying the sides of the frame and serving to limit oscillation of the frame relative to its mounting on the end of the springs 10.

On the opposite end of each group the frame 9 includes lugs 20 and spaced arms 21—21 each having a pin 22 overlying one of the springs 10. The lugs and pins serve to engage the springs and limit oscillation of the frame relative to its mounting.

In operation when the vehicle is moving forwardly or rearwardly and encounters an obstruction the shock tending to distort the ends of the springs in the pockets 12 is transmitted directly to the shaft 6 through the rigid arms 15, and the portions of the springs underlying the arms are relieved of the load. It is for this reason that the corresponding ends of the springs are free to move in the pockets 12.

When the vehicle is to be turned in changing direction, there is a lateral strain on the end wheels and the rigid arms 15, having a wide bearing on the pivot bars 13 of the frames and on the shafts 6, serve to absorb this strain and thereby relieve the springs.

Under normal running conditions all of the wheels are spring suspended.

I claim:

1. A truck unit for track-laying vehicles embodying a support adapted to be fixed to a vehicle, a pair of laterally spaced semi-elliptic springs centrally mounted on the support for movement in oscillation, a frame having a central pivot bar at each end of the springs, the pivot bar of one frame mounted in the corresponding ends of the springs, the other frame having pockets for receiving the opposite ends of the springs, a rigid arm journaled on the support and on the pivot bar of the frame having the pockets, and wheels mounted successively in each frame.

2. A truck unit for track-laying vehicles embodying a support, a pair of laterally spaced semi-elliptic springs centrally mounted on the support for movement in oscillation, a frame at each end of the springs, one frame having a sliding connection with the corresponding ends of the springs, the other frame having a pivotal connection with the opposite ends of the springs, a rigid arm having a pivotal connection with the support and with the frame having the sliding connection with the springs, and wheels mounted successively in each frame.

3. A truck unit for track-laying vehicles embodying a support, a semi-elliptic spring suspension centrally mounted on the support for movement in oscillation, a group of successively arranged wheels at each end of the spring suspension, one group having a sliding connection with the corresponding end of the spring suspension, the other group having a pivotal connection with the opposite end of the spring suspension, and a rigid connecting member having a pivotal connection with the support and with the group having the sliding connection with the spring suspension, said connecting member serving to limit oscillation of the group associated with it.

4. A truck unit for track-laying vehicles embodying a support, a semi-elliptic spring suspension centrally mounted on the support for movement in oscillation, a group of successively arranged wheels at each end of the spring suspension, one group having a sliding connection with the corresponding end of the spring suspension, the other group having a pivotal connection with the opposite end of the spring suspension, and a rigid connecting member having a pivotal connection with the support and with the group having the sliding connection with the spring suspension.

HARRY A. KNOX.